United States Patent [19]
Yoshida et al.

[11] Patent Number: 5,304,319
[45] Date of Patent: Apr. 19, 1994

[54] WORKING FLUID

[75] Inventors: Yuji Yoshida, Itami; Koji Arita, Osaka; Masami Funakura, Hirakata, all of Japan

[73] Assignee: Matsushita Electric Industrial Co., Ltd., Osaka, Japan

[21] Appl. No.: 839,700

[22] Filed: Feb. 24, 1992

Related U.S. Application Data

[63] Continuation of Ser. No. 620,888, Nov. 29, 1990, abandoned.

[30] Foreign Application Priority Data

| Nov. 30, 1989 | [JP] | Japan | 1-311153 |
| Nov. 30, 1989 | [JP] | Japan | 1-311156 |
| Nov. 30, 1989 | [JP] | Japan | 1-311158 |
| Nov. 30, 1989 | [JP] | Japan | 1-311160 |

[51] Int. Cl.⁵ .................................. C09K 5/04
[52] U.S. Cl. .......................... 252/67; 62/114
[58] Field of Search .................. 252/67; 62/114

[56] References Cited

U.S. PATENT DOCUMENTS

| 3,173,872 | 3/1965 | Broadley et al. | 252/67 |
| 3,444,085 | 5/1969 | Eiseman | 252/67 |
| 3,640,869 | 2/1972 | Orfeo et al. | 252/67 |
| 3,733,273 | 5/1973 | Munro | 252/67 |
| 4,810,403 | 3/1989 | Bivens et al. | 252/67 |
| 4,971,712 | 11/1990 | Gorski | 252/52 A |

FOREIGN PATENT DOCUMENTS 1-108291 4/1989 Japan.

OTHER PUBLICATIONS

World Patent Index (Latest), Derwent Pub. Lt'd (London)-abstract of JP-A-63-308084 (accession No. 89-035371 [05]), Dec. 1988.

Primary Examiner—Christine Skane
Attorney, Agent, or Firm—Wenderoth, Lind & Ponack

[57] ABSTRACT

A working fluid comprising tetrafluoroethane, difluoroethane and at least one fluorinated hydrocarbon having a boiling point of not higher than −40° C. under atmospheric pressure selected from the group consisting of methane derivatives and ethane derivatives which consist of one or two carbon atoms, hydrogen atoms and fluorine atoms, which has very small influence on the ozone layer in the stratosphere and is suitable as a substitute working fluid for chlorodifluoromethane.

8 Claims, 8 Drawing Sheets

WORKING FLUID

This application is a continuation of now abandoned application, Ser. No. 07/620,888, filed Nov. 29, 1990 now abandoned.

BACKGROUND OF THE INVENTION

1. Field of the Invention

The present invention relates to a working fluid which comprises plural halogenated hydrocarbons and is used in air conditoners, heat pumps and the like.

2. Description of the Related Art

Hitherto, as working fluids in air conditioners, heat pumps and the like, are used halogenated hydrocarbons derived from methane or ethane, which are also called as fluorinated halocarbons. They work at such utilization temperature that their condensation temperature and/or an evaporation temperature is from about 0 (zero) to about 50° C. Among them, chlorodifluoromethane ($CHClF_2$, R22) with a boiling point of $-40.8°$ C. is widely used as a working fluid in an air conditioner for a building and a large size refrigeration system.

Recently, depletion of the ozone layer in the stratosphere with fluorinated halocarbons is seriously discussed as one of the global environmental problems, and amounts to be used and produced of some fully halogenated chlorofluorocarbons (CFCs) which have high ozone depletion potential are limited by the Montreal Protocol. In future, their use and production will be banned.

R22 has an ozone depletion potential (hereinafter referred to as "ODP") of 0.05 when ODP of trichlorofluoromethane ($CCl_3F$, R11) is defined to be 1 (one). Though R22 is not a CFC, its production and use are expected to increase and it is expected that R22 will have significant influence on living in future, since the air conditioners and the heat pumps are and will be widely used. Therefore, it is highly desired to quickly develop a working fluid which has a small ODP and can be used as a substitute for R22.

SUMMARY OF THE INVENTION

An object of the present invention is to provide a working fluid which has less influence on the ozone layer in the stratosphere and can be used as a substitute for R22.

According to the present invention, there is provided a working fluid comprising tetrafluoroethane ($C_2H_2F_4$), difluoroethane ($C_2H_4F_2$) and at least one fluorinated hydrocarbon having a boiling point of not higher than $-40°$ C. under atmospheric pressure selected from the group consisting of methane derivatives and ethane derivatives which consist of one or two carbon atoms, hydrogen atoms and fluorine atoms (hereinafter referred to as "fluorinated methane or ethane derivative").

DETAILED DESCRIPTION OF THE INVENTION

Among the components of the working fluid of the present invention, tetrafluoroethane and difluoroethane have substantially no ozone depletion potential, namely their ODPs are substantially zero and they contain no chlorine atom in their molecular structures.

Since the fluorinated methane or ethane derivative has no chlorine atom in its molecular structure, it has substantially no ozone depletion potential. When it is mixed with tetrafluoroethane and difluoroethane, the mixture has substantially the same boiling point as R22.

Among the fluorinated methane or ethane derivatives, trifluoromethane ($CHF_3$, ODP=0), difluoromethane ($CH_2F_2$, ODP=0), pentafluoroethane ($C_2HF_5$, ODP=0) and trifluoroethane ($C_2H_3,F_3$, ODP=0) are preferred.

The working fluid of the present invention has a much smaller influence on the ozone layer in the stratosphere than R22, since it comprises tetrafluoroethane and difluoroethane which have substantially no ozone depletion potential (ODP=0) and the fluorinated methane or ethane derivative having the boiling point not higher than $-40°$ C. which contains no chlorine atom in the molecular structure and has substantially no ozone depletion potential.

In a specific composition range, the working fluid of the present invention has substantially the same vapor pressure as R22 in the temperature range between about 0° C. to about 50° C., and is suitable as a working fluid which can be used in presently used apparatuses as a substitute for R22.

The working fluid of the present invention is expected to have a very small ODP, namely substantially 0 (zero).

In addition, since the working fluid of the present invention is a non-azeotropic mixture and has a temperature gradient in the condensing and evaporating processes, a higher coefficient of performance (COP) than R22 is expected when Lorenz cycle in which a temperature difference from a heat source is decreased is assembled.

The fluorinated halocarbons having an ozone depletion potential tend to have a large global warming potential (hereinafter referred to as "GWP") when their ODP is large. Since the working fluid of the present invention comprises the above three essential components, its GWP may be substantially the same as or smaller than that of R22. Therefore, the working fluid of the present invention may have a smaller influence on global warming.

PREFERRED EMBODIMENTS OF THE INVENTION

The present invention will be illustrated by following Examples.

Example 1

Figure 1:
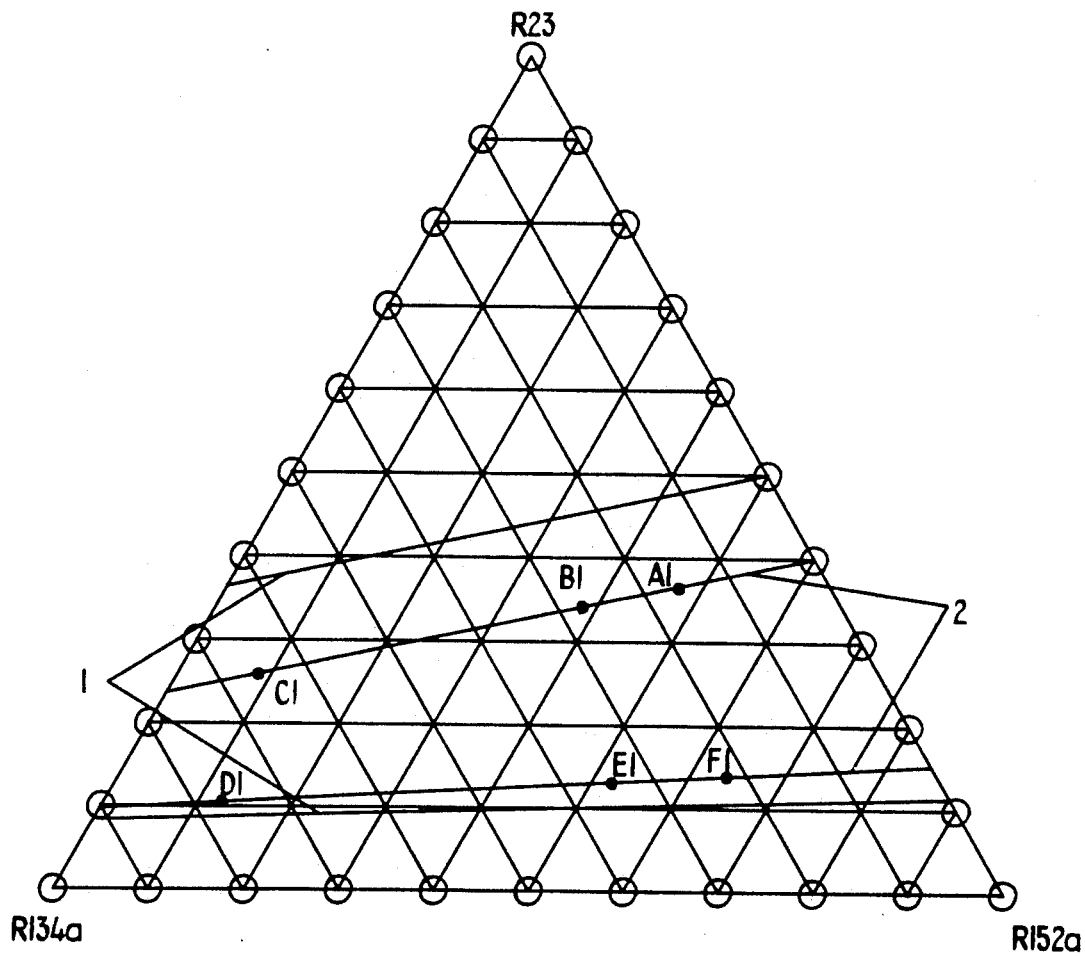
FIGS. 1 to 8 are ternary composition diagrams of the working fluids in Examples 1 to 8, respectively.

FIG. 1 shows a ternary composition diagram indicating equilibrium states of a mixture consisting of trifluoromethane (R23), 1,1,1,2-tetrafluoroethane (R134a) and 1,1-difluoroethane (R152a) at specific temperatures under specific pressure in a triangular coordinate.

In the triangular coordinate, in the counterclockwise direction from the top vertex, single compounds are assigned on the vertexes from a compound having the lowest boiling point to one having the highest boiling point. A composition (weight ratio) of the three compounds at one point on the triangular coordinate is expressed by a ratio of distances between said point and the opposite sides. The distance between said point and the opposite side corresponds to a proportion of the compound which is assigned to the vertex which faces said side.

In FIG. 1, the lines 1 are phase equilibrium lines of the mixture at 0° C. under pressure of 4.044 kg/cm² G. These temperature and pressures correspond to a saturated state of R22. The upper one of the phase equilibrium lines 1 (corresponding to R22 at 0° C.) is a saturated vapor line, and the lower one is a saturated liquid line. In the area between these two lines, the mixture is in the phase equilibrium state. The lines 2 are phase equilibrium lines of the mixture at 50° C. under a pressure of 18.782 kg/cm² G. These temperatures and pressures correspond to a saturated state of R22.

The composition in the area between lines 1 (the phase equilibrium lines at 0° C.) changes from the liquid phase to the vapor phase under a pressure higher than R22 at 0° C. and, under the same pressure as R22, the liquid phase having a temperature lower than 0° C. is evaporated to form the vapor phase having a temperature higher than 0° C.

If R23 alone is used, it exceeds the critical temperature at 50° C. However, the mixture has the saturated state so that it can be used in the air conditioner or heat pump which has a utilization temperature range between about 0° C. and about 50° C.

As understood from FIG. 1, the mixture comprising about 5 to about 50% by weight of R23, about 0 to about 95 by weight (for example, about 1 to about 95% by weight) of R134a and about 0 to about 90% by weight (for example, about 1 to about 90% by weight) of R152a is preferred, since it has substantially the same vapor pressure as R22 in the utilization temperature range between about 0° C. and about 50° C. Further, the mixture comprising about 10 to about 40% by weight of R23, about 0 to about 90% by weight (for example, about 1 to about 90% by weight) of R134a and about 0 to about 85% by weight (for example, about 1 to about 85% by weight) of R152a is more preferred, since it has substantially the same vapor pressure as R22 at all the utilizing temperatures between 0° C. and 50° C.

The compositions of the working fluids at the points A1 to F1 in FIG. 1 are shown in Table 1.

TABLE 1

| Point | A1 | B1 | C1 | D1 | E1 | F1 |
|---|---|---|---|---|---|---|
| R23 (wt. %) | 36.8 | 34.6 | 26.7 | 10.3 | 13.5 | 14.3 |
| R134a (wt. %) | 16.9 | 27.1 | 64.2 | 77.8 | 34.3 | 21.6 |
| R152a (wt. %) | 46.3 | 38.3 | 9.1 | 11.9 | 52.3 | 64.1 |

The points A1, B1 and C1 are on the saturated vapor line of the phase equilibrium lines 2 (corresponding to R22 at 50° C.), and the points D1, E1 and F1 are on the saturated liquid line of the phase equilibrium lines 2. Further, all of them are in the area between the saturated vapor line and the saturated liquid line of the phase equilibrium lines 1 (corresponding to R22 at 0° C). Therefore, the mixture is in the phase equilibrium state at 0° C. under pressure of 4.044 kg/cm² G which correspond to the saturated state of R22.

Then, the working fluid having the composition in Table 1 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C) have been explained. In addition, when working fluids having compositions in the area inside the points A1 to F1, namely those having compositions which realize the phase equilibrium states at 0° C. under pressure of 4.044 kg/cm² G and at 50° C. under pressure of 18.782 kg/cm² G both corresponding to the saturated state of R22 are operated in a similar way to the above, condensation and evaporation temperatures which are substantially the same as those of R22 can be achieved in the utilization temperature range between about 0° C. and about 50° C.

Example 2

Figure 2:
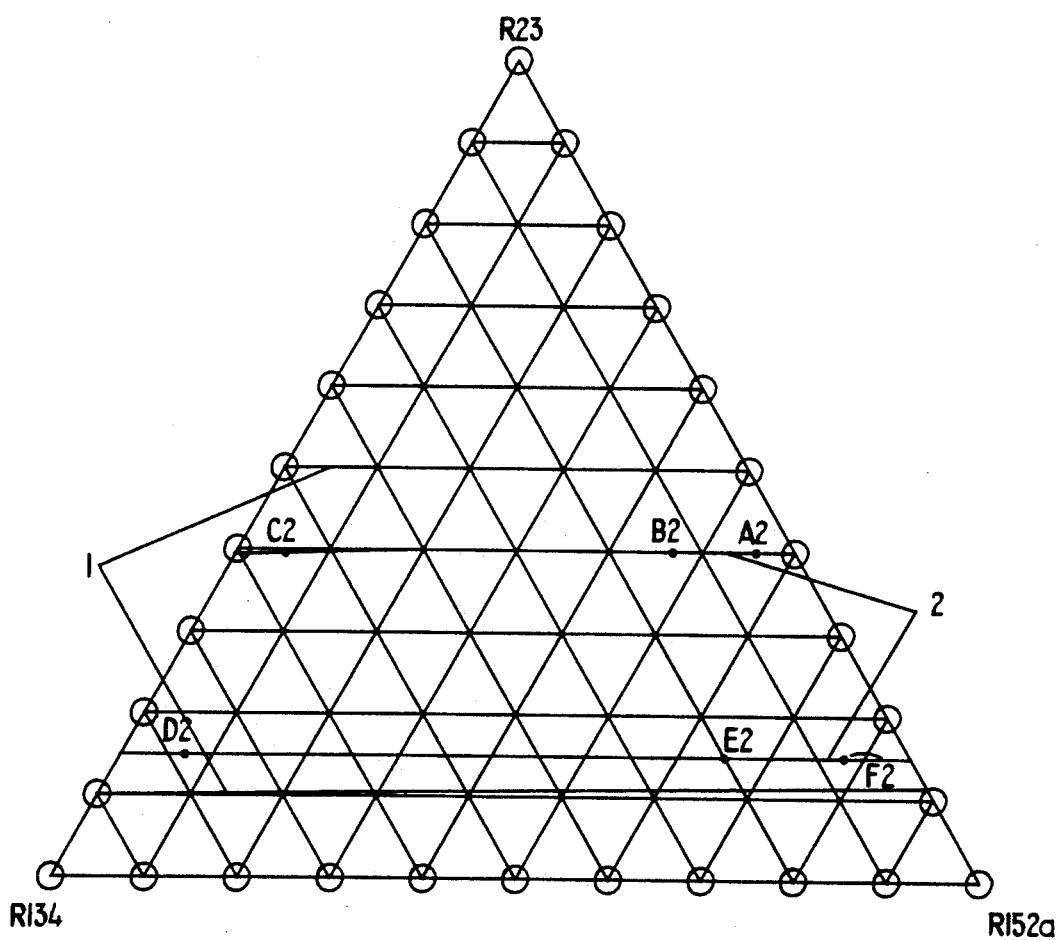

FIG. 2 shows a ternary composition diagram indicating equilibrium states of a mixture consisting of R23, 1,1,2,2-tetrafluoroethane (R134) and R152a at specific temperatures under specific pressure in a triangular coordinate.

Although R152a has a lower boiling point than R134 under atmospheric pressure, in FIG. 2, R23, R134 and R152a are assigned to the vertexes in this order from the top vertex in the counterclockwise for easy comparision with FIG. 1. In FIG. 2, the lines 1 are phase equilibrium lines of the mixture at 0° C. under pressure of 4.044 kg/cm² G, and the lines 2 are phase equilibrium lines of the mixture at 50° C. under pressure of 18.782 kg/cm² G.

As understood from FIG. 2, the mixture comprising about 10 to about 50% by weight of R23, about 0 to about 90 by weight (for example, about 1 to about 90% by weight) of R134 and about 0 to about 90% by weight (for example, about 1 to about 90% by weight) of R152a is preferred, since it has substantially the same vapor pressure as R22. Further, the mixture comprising about 15 to about 40% by weight of R23, about 0 to about 85% by weight (for example, about 1 to about 85% by weight) of R134 and about 0 to about 85% by weight (for example, about 1 to about 85% by weight) of R152a is more preferred.

The compositions of the working fluids at the points A2 to F2 in FIG. 2 are shown in Table 2.

TABLE 2

| Point | A2 | B2 | C2 | D2 | E2 | F2 |
|---|---|---|---|---|---|---|
| R23 (wt. %) | 40.4 | 40.4 | 40.8 | 15.2 | 15.6 | 15.8 |
| R134 (wt. %) | 4.3 | 12.6 | 53.4 | 77.6 | 19.9 | 6.9 |
| R152a (wt. %) | 55.3 | 47.0 | 5.8 | 7.2 | 64.5 | 77.3 |

The points A2, B2 and C2 are on the saturated vapor line of the phase equilibrium lines 2 (corresponding to R22 at 50° C.), and the points D2, E2 and F2 are on the saturated liquid line of the phase equilibrium lines 2. Further, all of them are in the area between the saturated vapor line and the saturated liquid line of the phase equilibrium lines 1 (corresponding to R22 at 0° C.). Therefore, the mixture is in the phase equilibrium state at 0° C. under pressure of 4.044 kg/cm² G which correspond to the saturated state of R22.

Then, the working fluid having the composition in Table 2 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

In the above, the mixtures having the compositions on the phase equilibrium lines 2 (corresponding to R22 at 50° C.) have been explained. In addition, when working fluids having compositions in the area inside the points A2 to F2, namely those having compositions which realize the phase equilibrium states at 0° C. under pressure of 4.044 kg/cm$^2$ G and at 50° C. under pressure of 18.782 kg/cm$^2$ G both corresponding to the saturated state of R22 are operated in the similar way to the above, condensation and evaporation temperatures which are substantially the same as those of R22 can be achieved in the utilization temperature range between about 0° C. and about 50° C.

As understood from FIGS. 1 and 2, the mixture comprising about 5 to about 50% by weight of R23, about 0 to about 95% by weight (for example, about 1 to about 95% by weight) of tetrafluoroethane and about 0 to about 90% by weight (for example, about 1 to about 90% by weight) of difluoroethane is preferred, since it has substantially the same vapor pressure as R22 in the utilization temperature between about 0° C. and about 50° C. Further, the mixture comprising about 10 to about 40% by weight of R23, about 0 to about 85% by weight (for example, about 1 to about 85% by weight) of tetrafluoroethane and about 0 to about 85% by weight (for example, about 1 to about 85% by weight) of difluoroethane is more preferred, since it has substantially the same vapor pressure as R22 at all the utilizing temperatures between 0° C. and 50° C.

Since the working fluids in Examples 1 and 2 are expected to have the ODP of 0 (zero), they are very promising as substitute working fluids for R22.

Example 3

Figure 3:
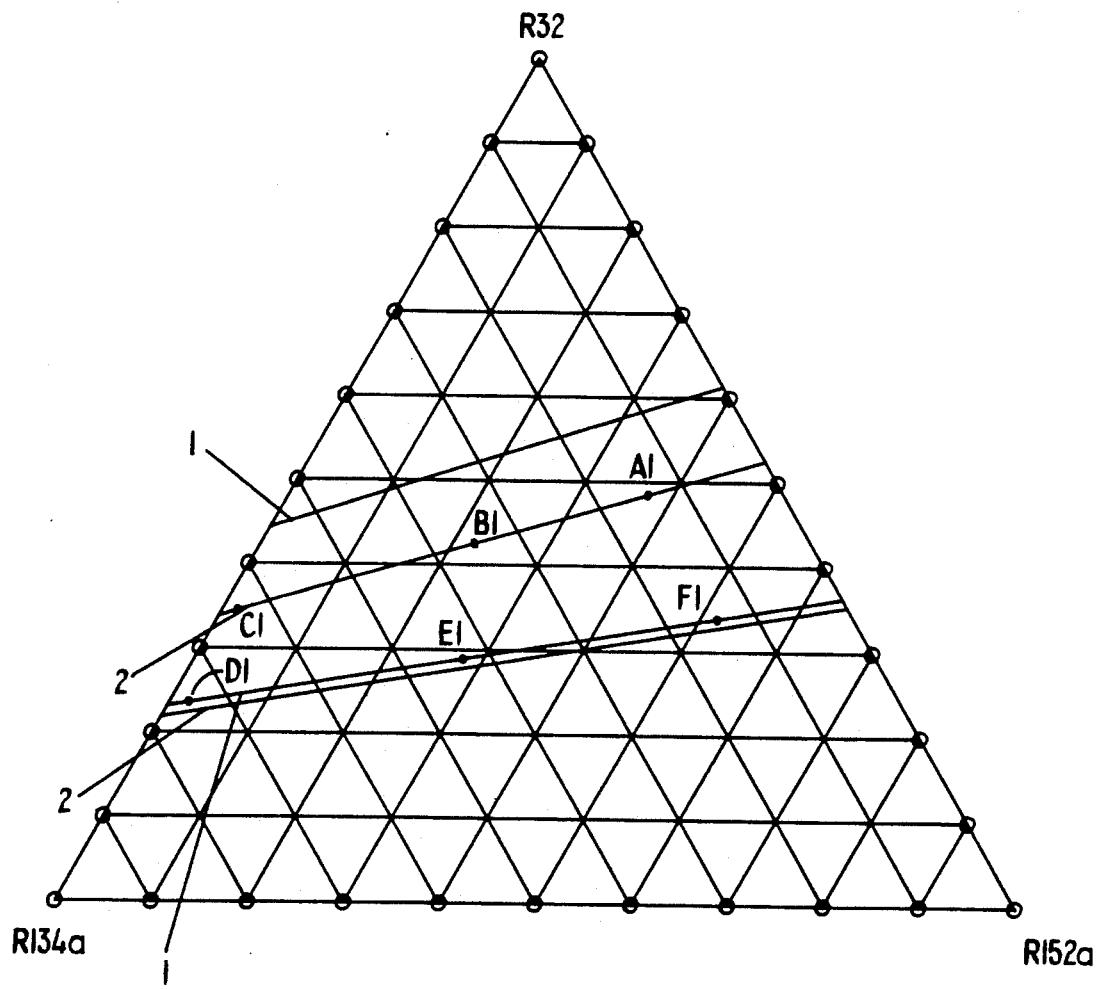

FIG. 3 shows a ternary composition diagram indicating equilibrium states of a mixture consisting of difluoromethane (R32), R134 and 152a at specific temperatures under specific pressure in a triangular coordinate. In FIG. 3, the lines 1 are phase equilibrium lines of the mixture at 0° C. under pressure of 4.044 kg/cm$^2$ G, and the lines 2 are phase equilibrium lines of the mixture at 50° C. under pressure of 18.782 kg/cm$^2$ G.

The compositions of the working fluids at the points A1 to F1 in FIG. 3 are shown in Table 3.

TABLE 3

| Point | A1 | B1 | C1 | D1 | E1 | F1 |
|---|---|---|---|---|---|---|
| R32 (wt. %) | 48.4 | 41.5 | 34.5 | 24.3 | 29.3 | 34.1 |
| R134a (wt. %) | 12.6 | 37.3 | 63.0 | 74.4 | 43.0 | 13.7 |
| R152a (wt. %) | 39.0 | 21.2 | 2.5 | 1.3 | 27.7 | 52.2 |

In this case, the mixture comprising about 20 to about 60% by weight of R32, about 0 to about 80% by weight (for example, about 1 to about 80% by weight) of R134a and about 0 to about 65% by weight (for example, about 1 to about 65% by weight) of R152a is preferred since it has substantially the same vapor pressure as R22 in the utilization temperature between about 0° C. and about 50° C. Further, the mixture comprising about 25 to about 50% by weight of R32, about 0 to about 75% by weight (for example, about 1 to about 75% by weight) of R134a and about 0 to about 65% by weight (for example, about 1 to about 65% by weight) of R152a is more preferred, since it has substantially the same vapor pressure as R22 at all utilizing temperatures between 0° C. and 50° C.

The working fluid having the composition in Table 3 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

Example 4

Figure 4:
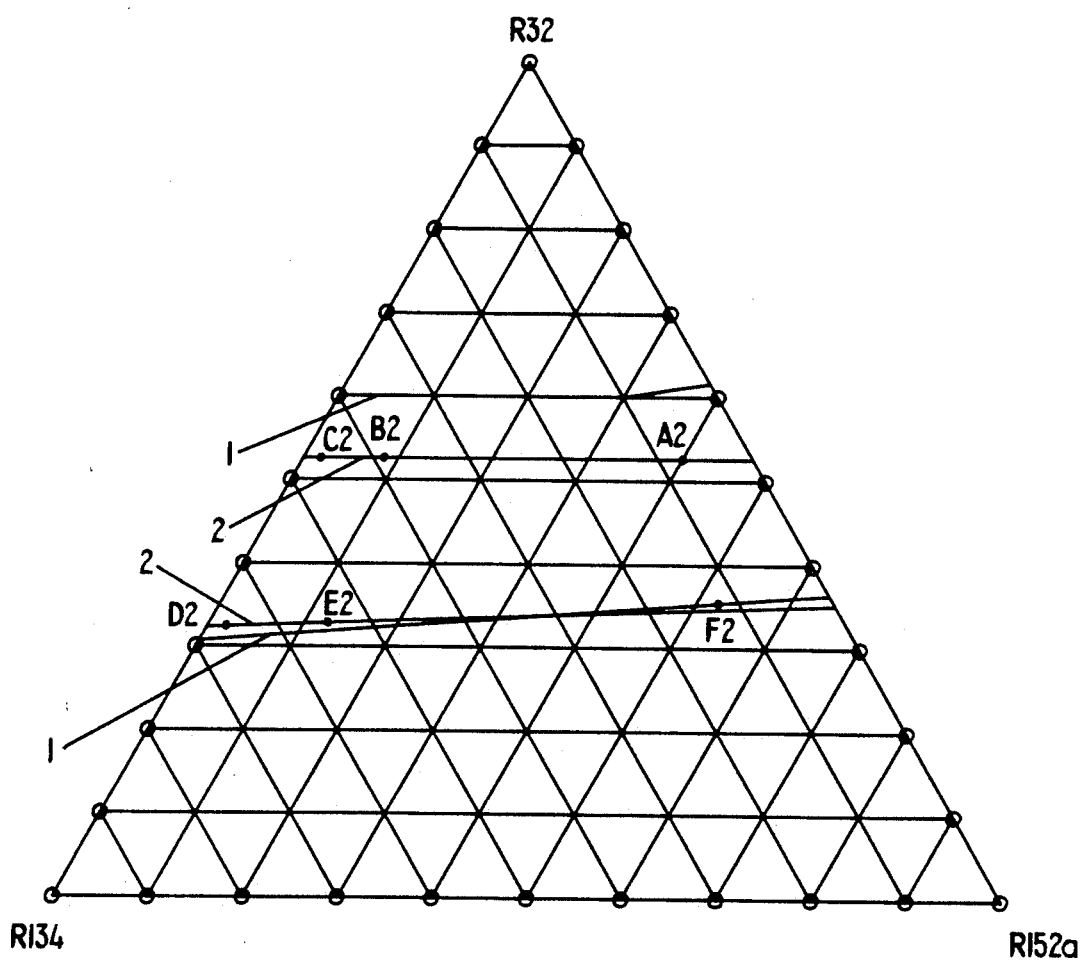

FIG. 4 shows a ternary composition diagram indicating equilibrium states of a mixture consisting of R32, R134 and 152a at specific temperatures under specific pressure in a triangular coordinate.

The compositions of the working fluids at the points A2 to F2 in FIG. 4 are shown in Table 4.

TABLE 4

| Point | A2 | B2 | C2 | D2 | E2 | F2 |
|---|---|---|---|---|---|---|
| R32 (wt. %) | 51.9 | 51.8 | 51.8 | 32.5 | 33.0 | 35.4 |
| R134 (wt. %) | 8.3 | 38.6 | 47.0 | 66.0 | 55.2 | 11.9 |
| R152a (wt. %) | 39.8 | 9.6 | 1.2 | 1.5 | 11.8 | 52.7 |

In this case, the mixture comprising about 30 to about 60% by weight of R32, about 0 to about 70% by weight (for example, about 1 to about 70% by weight) of R134 and about 0 to about 65% by weight (for example, about 1 to about 65% by weight) of R152a is preferred, and further, the mixture comprising about 35 to about 50% by weight of R32, about 0 to about 65% by weight (for example, about 1 to about 65% by weight) of R134 and about 0 to about 65% by weight (for example, about 1 to about 65% by weight) of R152a is more preferred.

As understood from FIGS. 3 and 4, the mixture comprising about 20 to about 60% by weight of R32, about 0 to about 80% by weight (for example, about 1 to about 80% by weight) of tetrafluoroethane and about 0 to about 65% by weight (for example, about 1 to about 65% by weight) of difluoroethane is preferred. Further, the mixture comprising about 25 to about 50% by weight of R32, about 0 to about 75% by weight (for example, about 1 to about 75% by weight) of tetrafluoroethane and about 0 to about 65% by weight (for example, about 1 to about 65% by weight) of difluoroethane is more preferred.

Since the working fluids in Examples 3 and 4 are expected to have the ODP of 0 (zero), they are very promising as substitute working fluids for R22.

Example 5

Figure 5:
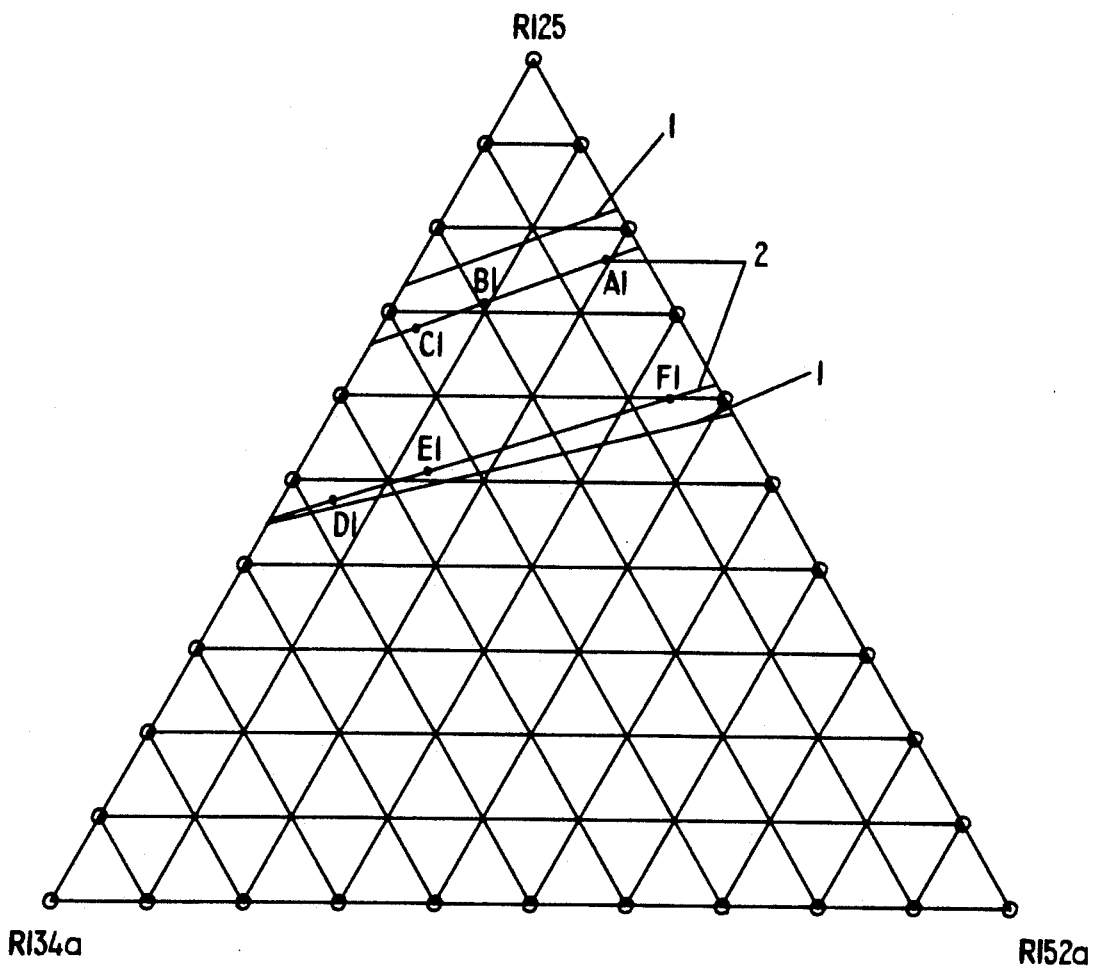

FIG. 5 shows a ternary composition diagram indicating equilibrium states of a mixture consisting of pentafluoroethane (R125), R134a and 152a at specific temperatures under specific pressure in a triangular coordinate. In FIG. 5, the lines 1 are phase equilibrium lines of the mixture at 0° C. under pressure of 4.044 kg/cm$^2$ G, and the lines 2 are phase equilibrium lines of the mixture at 50° C. under pressure of 18.782 kg/cm$^2$ G.

The compositions of the working fluids at the points A1 to F1 in FIG. 5 are shown in Table 5.

TABLE 5

| Point | A1 | B1 | C1 | D1 | E1 | F1 |
|---|---|---|---|---|---|---|
| R125 (wt. %) | 78.4 | 71.9 | 67.9 | 58.9 | 63.1 | 69.9 |
| R134a (wt. %) | 2.3 | 18.8 | 29.3 | 37.3 | 24.3 | 3.1 |
| R152a (wt. %) | 19.3 | 9.3 | 2.8 | 3.8 | 12.6 | 27.0 |

In this case, the mixture comprising about 55 to about 85% by weight of R125, about 0 to about 45% by weight (for example, about 1 to about 45% by weight) of R134a and about 0 to about 30% by weight (for example, about 1 to about 30% by weight) of R152a is preferred since it has substantially the same vapor pressure as R22 in the utilization temperature between about 0° C. and about 50° C. Further, the mixture comprising about 55 to about 80% by weight of R125, about 0 to about 45% by weight (for example, about 1 to about 45% by weight) of R134a and about 0 to about 30% by weight (for example, about 1 to about 30% by weight) of R152a is more preferred, since it has substantially the same vapor pressure as R22 at all the utilizing temperature between 0° C. and 50° C.

The working fluid having the composition in Table 5 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

Example 6

FIG. 4 shows a ternary composition diagram indicating equilibrium states of a mixture consisting of R125, R134 and 152a at specific temperatures under specific pressure in a triangular coordinate.

Figure 6:
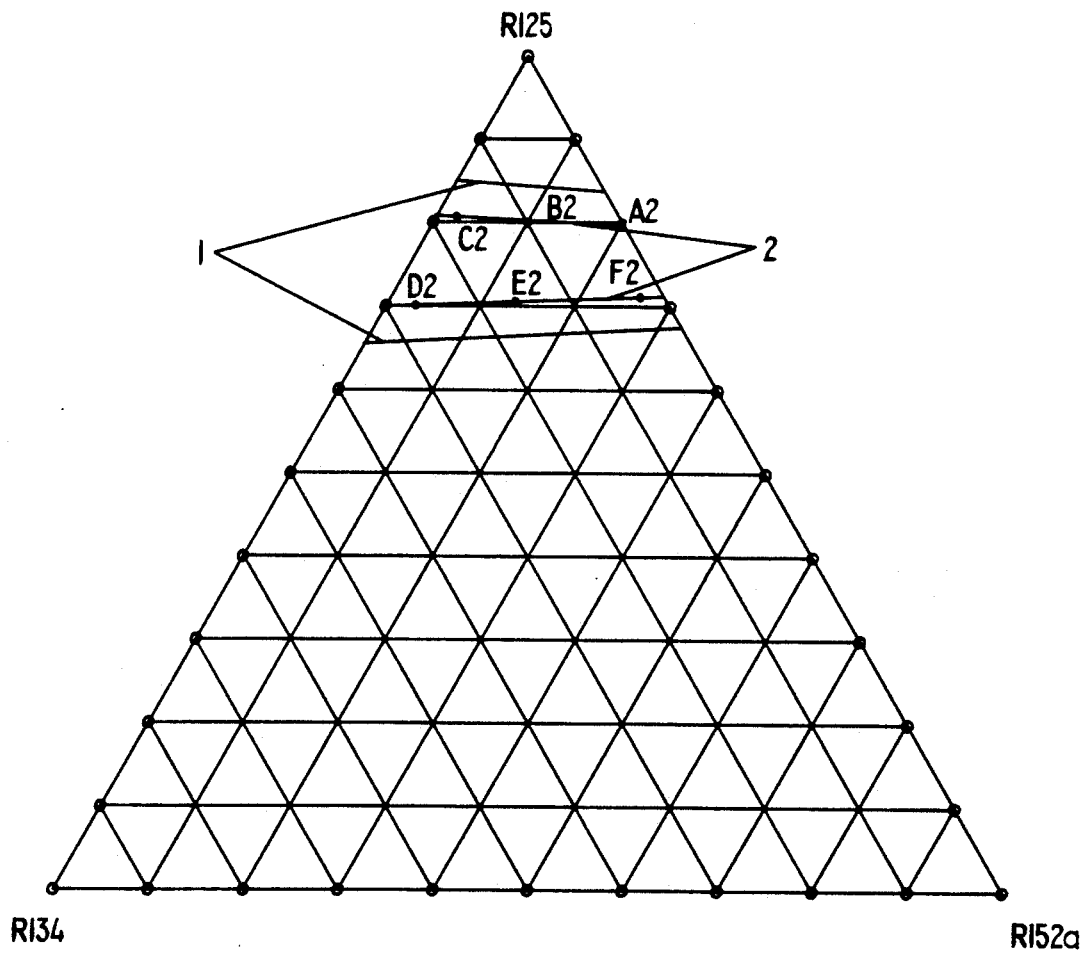

The compositions of the working fluids at the points A2 to F2 in FIG. 6 are shown in Table 6.

TABLE 6

| Point | A2 | B2 | C2 | D2 | E2 | F2 |
|---|---|---|---|---|---|---|
| R125 (wt. %) | 79.3 | 80.0 | 80.6 | 70.4 | 70.5 | 70.8 |
| R134 (wt. %) | 1.4 | 10.8 | 17.6 | 27.2 | 17.0 | 2.2 |
| R152a (wt. %) | 19.3 | 9.2 | 1.8 | 2.4 | 12.5 | 27.0 |

In this case, the mixture comprising about 65 to about 85% by weight of R125, about 0 to about 35% by weight (for example, about 1 to about 35% by weight) of R134 and about 0 to about 30% by weight (for example, about 1 to about 30% by weight) of R152a is preferred, and further, the mixture comprising about 70 to about 80% by weight of R125, about 0 to about 30% by weight (for example, about 1 to about 30% by weight) of R134 and about 0 to about 30% by weight (for example, about 1 to about 30% by weight) of R152a is more preferred.

As understood from FIGS. 5 and 6, the mixture comprising about 55 to about 85% by weight of R125, about 0 to about 45% by weight (for example, about 1 to about 45% by weight) of tetrafluoroethane and about 0 to about 30% by weight (for example, about 1 to about 30% by weight) of difluoroethane is preferred. Further, the mixture comprising about 55 to about 80% by weight of R125, about 0 to about 45% by weight (for example, about 1 to about 45% by weight) of tetrafluoroethane and about 0 to about 30% by weight (for example, about 1 to about 30% by weight) of difluoroethane is more preferred.

Since the working fluids in Examples 5 and 6 are expected to have the ODP of 0 (zero), they are very promising as substitute working fluids for R22.

Example 7

Figure 7:
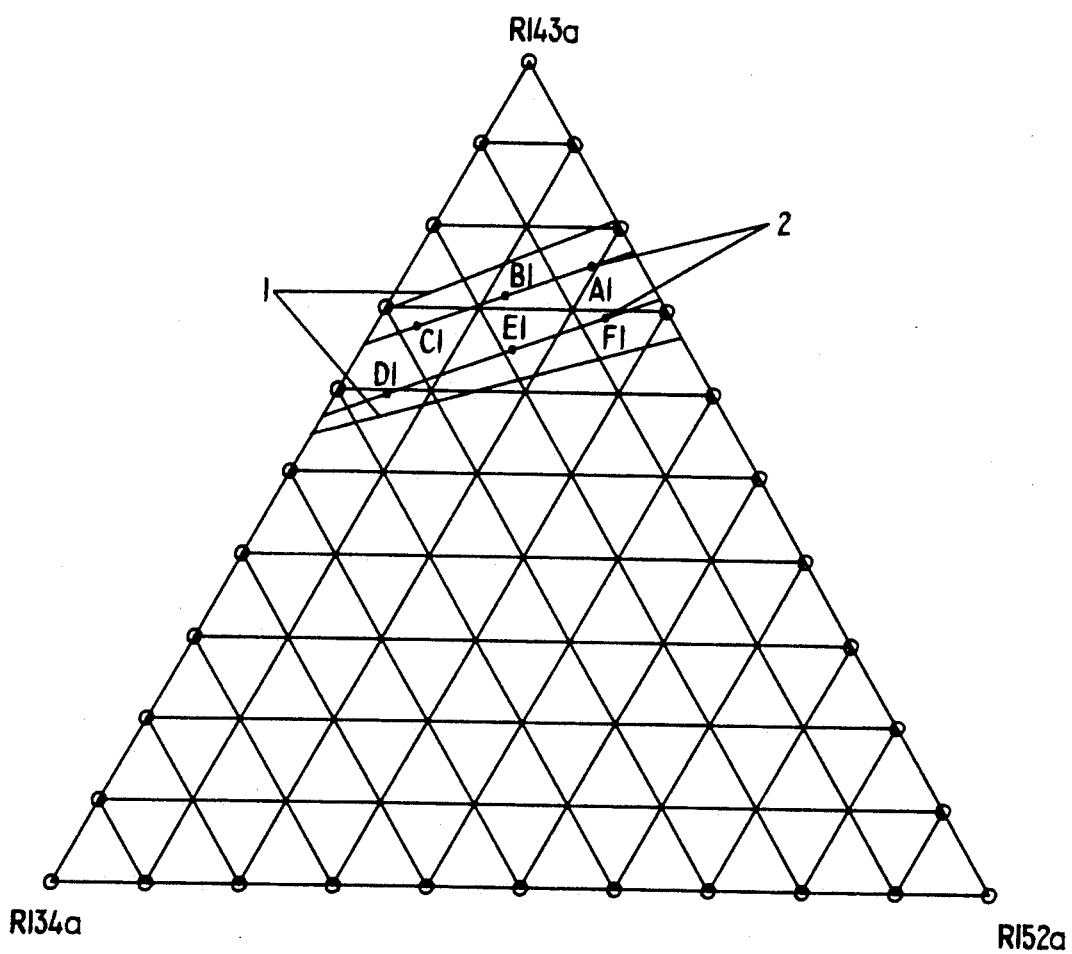

FIG. 7 shows a ternary composition diagram indicating equilibrium states of a mixture consisting of 1,1,1-trifluoroethane (R143a), R134a and R152a at specific temperatures under specific pressure in a triangular coordinate. In FIG. 7, the lines 1 are phase equilibrium lines of the mixture at 0° C. under pressure of 4.044 kg/cm² G, and the lines 2 are phase equilibrium lines of the mixture at 50° C. under pressure of 18.782 kg/cm² G.

The compositions of the working fluids at the points A1 to F1 in FIG. 7 are shown in Table 7.

TABLE 7

| Point | A1 | B1 | C1 | D1 | E1 | F1 |
|---|---|---|---|---|---|---|
| R143a (wt. %) | 76.8 | 72.6 | 67.7 | 59.8 | 64.8 | 69.2 |
| R134a (wt. %) | 4.6 | 15.4 | 28.1 | 34.7 | 19.3 | 5.9 |
| R152a (wt. %) | 18.6 | 12.0 | 4.2 | 5.5 | 15.9 | 24.9 |

In this case, the mixture comprising about 55 to about 80% by weight of R143a, about 0 to about 45% by weight (for example, about 1 to about 45% by weight) of R134a and about 0 to about 35% by weight (for example, about 1 to about 35% by weight) of R152a is preferred since it has substantially the same vapor pressure as R22 in the utilization temperature between about 0° C. and about 50° C. Further, the mixture comprising about 55 to about 80% by weight of R143a, about 0 to about 45% by weight (for example, about 1 to about 45% by weight) of R134a and about 0 to about 30% by weight (for example, about 1 to about 30% by weight) of R152a is more preferred, since it has substantially the same vapor pressure as R22 at all the utilizing temperature between 0° C. and 50° C.

The working fluid having the composition in Table 7 is in the saturated state or the phase equilibrium state under the saturated vapor pressure condition of R22 at 0° C. and 50° C., so that, in the utilization temperature range between about 0° C. and about 50° C., the working fluid has substantially the same condensation and evaporation temperatures as R22 when operated under the saturated vapor pressure of R22 at said temperatures.

Example 8

Figure 8:
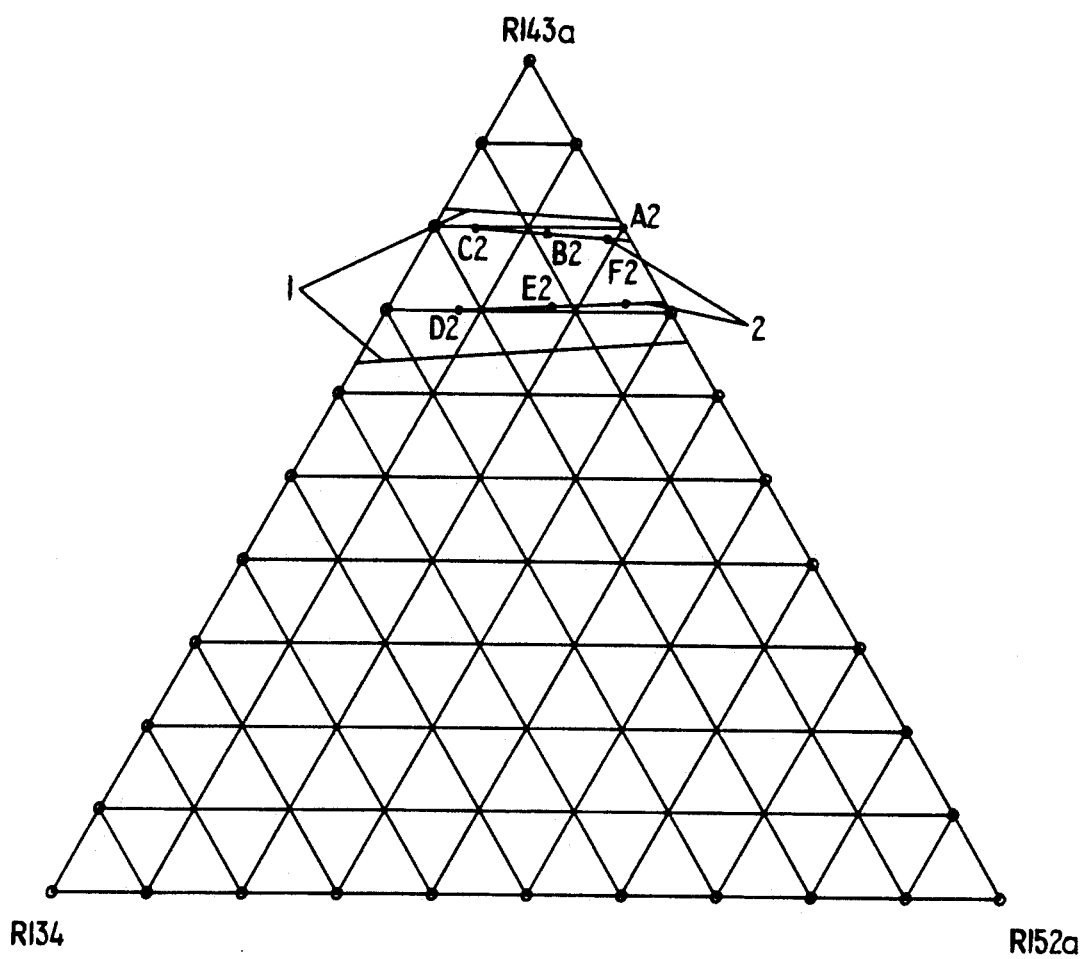
Figure 5:
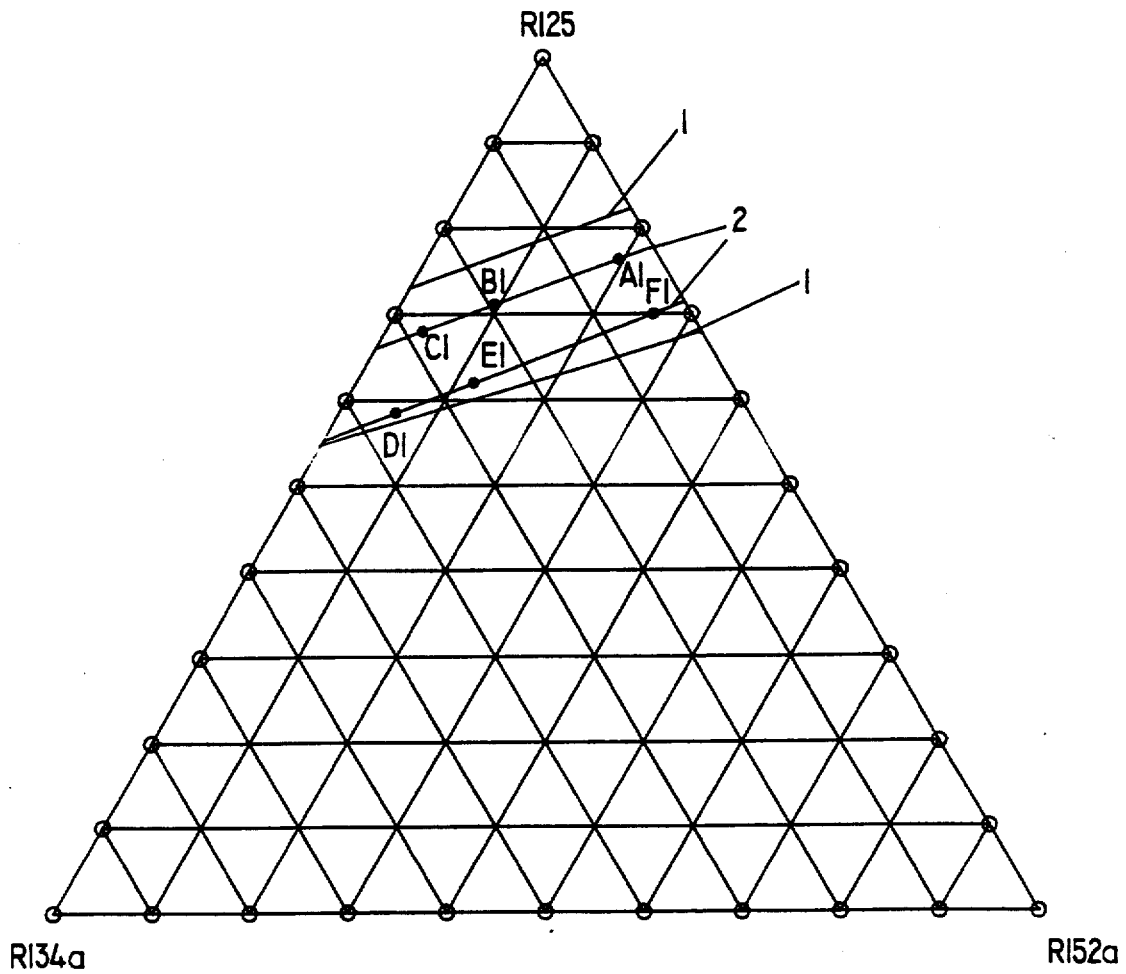

FIG. 8 shows a ternary composition diagram indicating equilibrium states of a mixture consisting of R143a, R134 and 152a at specific temperatures under specific pressure in a triangular coordinate.

The compositions of the working fluids at the points A2 to F2 in FIG. 8 are shown in Table 8.

TABLE 8

| Point | A2 | B2 | C2 | D2 | E2 | F2 |
|---|---|---|---|---|---|---|
| R143a (wt. %) | 78.7 | 79.1 | 79.6 | 70.5 | 70.7 | 71.0 |
| R134 (wt. %) | 2.6 | 8.1 | 14.4 | 21.8 | 12.4 | 4.0 |
| R152a (wt. %) | 18.7 | 12.8 | 6.0 | 7.7 | 16.9 | 25.0 |

In this case, the mixture comprising about 65 to about 80% by weight of R143a, about 0 to about 35% by weight (for example, about 1 to about 35% by weight) of R134 and about 0 to about 35% by weight (for example, about 1 to about 35% by weight) of R152a is preferred, and further, the mixture comprising about 70 to about 80% by weight of R143a, about 0 to about 30% by weight (for example, about 1 to about 30% by weight) of R134 and about 0 to about 30% by weight (for example, about 1 to about 30% by weight) of R152a is more preferred.

As understood from FIGS. 7 and 8, the mixture comprising about 55 to about 80% by weight of trifluoroethane, about 0 to about 45% by weight (for example, about 1 to about 45% by weight) of tetrafluoroethane and about 0 to about 35% by weight (for example, about 1 to about 35% by weight) of difluoroethane is preferred. Further, the mixture comprising about 55 to about 80% by weight of R143a, about 0 to about 45% by weight (for example, about 1 to about 45% by weight) of tetrafluoroethane and about 0 to about 30% by weight (for example, about 1 to about 30% by weight) of difluoroethane is more preferred.

Since the working fluids in Examples 7 and 8 are expected to have the ODP of 0 (zero), they are very promising as substitute working fluids for R22.

From the above results in Examples 1-8, it is understood that the mixture comprising not more than 95% (for example, about 1 to about 95% by weight) of tetrafluoroethane, not more than 90% by weight (for example, about 1 to about 90% by weight) of difluoroethane and 5 to 50% by weight of trifluoromethane or 20 to 60% by weight of difluoromethane or 55 to 85% by weight of pentafluoroethane or 55 to 80% by weight of trifluoroethane is preferred. Further, the mixture comprising not more than 85% (for example, about 1 to about 85% by weight) of tetrafluoroethane, not more than 85% by weight (for example, about 1 to about 85% by weight) of difluoroethane and 10 to 40% by weight of trifluoromethane or 25 to 50% by weight of difluoromethane or 55 to 80% by weight of pentafluoroethane or 55 to 80% by weight of trifluoroethane is more preferred.

In the above Examples, the mixtures contain three fluorinated halocarbons, although it is possible to mix four or more fluorinated halocarbon including structural isomers. In such case, preferably, the mixture comprises tetrafluoroethane as the first component, difluoroethane as the second component and at least one component selected from the group consisting of trifluoromethane, difluoromethane, pentafluoroethane and trifluoroethane.

What is claimed is:

1. A working fluid which consists essentially of 1 to 95% by weight of tetrafluoroethane, 1 to 90% by weight of 1,1- difluoroethane and one fluorinated hydrocarbon having a boiling point of not higher than −40° C. under atmospheric pressure, selected from the group consisting of 5 to 50% by weight of trifluoromethane, 20 to 60% by weight of difluoromethane, and 55 to 80% by weight of 1,1,1-trifluoroethane, which has a composition in a range between phase equilibrium lines which are obtained when 0° C. is specified as a temperature and the same vapor pressure as that of chlorodifluoromethane at 0° C. is specified as a vapor pressure or a range between phase equilibrium lines which are obtained when 50° C. is specified as a temperature and the same vapor pressure as that of chlorodifluoromethane at 50° C. is specified as a vapor pressure.

2. The working fluid as claimed in claim 1, which consists essentially of 1 to 85% by weight of tetrafluoroethane, 1 to 85% by weight of 1,1-difluoroethane and one fluorinated hydrocarbon selected from the group consisting of 10 to 40% by weight of trifluoromethane, 25 to 50% by weight of difluoromethane, and 55 to 80% by weight of 1,1,1-trifluoroethane.

3. The working fluid as claimed in claim 1, which consists essentially of 5 to 50% by weight of trifluoromethane, 1 to 95% by weight of tetrafluoroethane and 1 to 90% by weight of 1,1-difluoroethane.

4. The working fluid as claimed in claim 3, which consists essentially of 10 to 40% by weight of trifluoromethane, 1 to 85% by weight of tetrafluoroethane and 1 to 85% by weight of 1,1-difluoroethane.

5. The working fluid as claimed in claim 1, which consists essentially of 20 to 60% by weight of difluoromethane, 1 to 80% by weight of tetrafluoroethane and 1 to 65% by weight of 1,1-difluoroethane.

6. The working fluid as claimed in claim 5, which consists essentially of 25 to 50% by weight of difluoromethane, 1 to 75% by weight of tetrafluoroethane and 1 to 65% by weight of 1,1-difluoroethane.

7. The working fluid as claimed in claim 1, which consists essentially of 55 to 80% by weight of 1,1,1-trifluoroethane, 1 to 45% by weight of tetrafluoroethane and 1 to 35% by weight of 1,1-difluoroethane.

8. The working fluid as claimed in claim 7, which consists essentially of 55 to 80% by weight of 1,1,1-trifluoroethane, 1 to 45% by weight of tetrafluoroethane and 1 to 30% by weight of 1,1-difluoroethane.

* * * * *

UNITED STATES PATENT AND TRADEMARK OFFICE
CERTIFICATE OF CORRECTION

PATENT NO. : 5,304,319
DATED : April 19, 1994
INVENTOR(S) : Yuji Yoshida et al

It is certified that error appears in the above-indentified patent and that said Letters Patent is hereby corrected as shown below:

Drawing sheet consisting of Figure 5, should be deleted and replaced with the drawing sheet , consisting of Figure 5, as shown on the attached page.

Signed and Sealed this

Twenty-first Day of February, 1995

*Attest:*

BRUCE LEHMAN

*Attesting Officer*    *Commissioner of Patents and Trademarks*